Aug. 6, 1963 F. M. FOLK 3,099,954
TILE MEASURING MACHINE
Filed Dec. 9, 1960
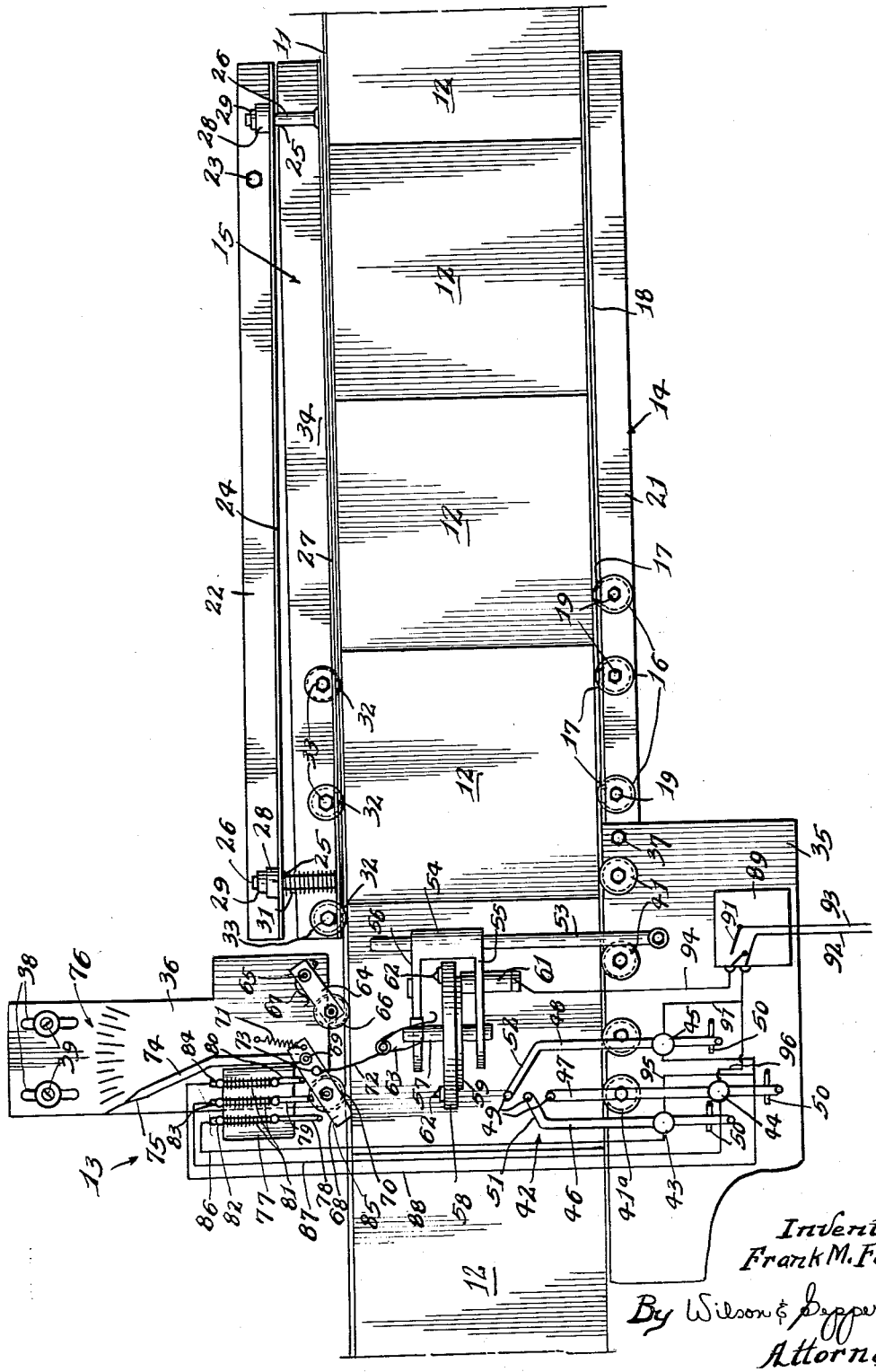
Inventor.
Frank M. Folk.
By Wilson & Peppers
Attorneys.

United States Patent Office 3,099,954
Patented Aug. 6, 1963

3,099,954
TILE MEASURING MACHINE
Frank M. Folk, New Lexington, Ohio, assignor to Ludowici-Celadon Co., Chicago, Ill., a corporation of Illinois
Filed Dec. 9, 1960, Ser. No. 74,987
6 Claims. (Cl. 101—43)

The present invention relates to an apparatus for inspecting material for imperfections and more particularly to the inspection of flat products such as tile.

Tile to be used in the building industry for the surfacing of roofs, walls and the like must be manufactured with a degree of precision so that the tiles are uniform in length, width and thickness. Tiles may be extruded or formed in precision molds, the extrusion operation being considerably faster and having sufficient accuracy to keep the dimensions of the tiles within prescribed tolerances. The tile is extruded in a ribbon of substantially constant width and thickness and knives or other suitable means cut the ribbon into tiles of proper length. Most of the tile used today is generally rectangular.

The extrusion die or orifice at the mouth of the extruder is not always absolutely accurate, or the material leaving the extrusion die may expand to an undesired extent, to give tiles of non-uniform dimensions. These tiles must be sized to the proper dimensions after forming if the tolerances are exceeded. Since these discrepancies in the dimensions of the formed tiles may not be noticeable to the naked eye, some means of detecting oversized tiles is required. To measure each tile individually would be time consuming and unprofitable.

The present invention relates to a machine for measuring tiles and marking those which are oversize so that they can be removed and trimmed to proper size before packaging or other production steps. The invention will measure one dimension of the tile on their passage therethrough, usually the width of the tile. Two such machines could be used in succession if both length and width are to be checked. In an extrusion operation, the thickness of the extruded ribbon is generally constant, so the thickness need not be measured.

An important object of the present invention is the provision of a machine to measure a dimension of tile passing through the machine at relatively high speed. The machine is mounted so that a moving belt carrying the tile passes therethrough. The invention also provides guide members prior to the measuring mechanism to orient the tile in proper position on the belt for the measuring operation.

Another important object of the present invention is the provision of marking means actuated by any oversize tile passing through the machine which will mark the oversize tile whereby they can be identified and later trimmed to the proper size. These markers are actuated by solenoid or magnetic coils which are energized through an electrical circuit, the number of markers activated depending on the size of the tile.

The present invention further comprehends the provision of a visible indicating means on the machine which would indicate to the operator of the machine whether the tiles were oversize or of proper dimensions. Thus, if the tiles were consistently oversize, the operator on observing this fact would cause appropriate adjustments to be made at the extruder or at the cutting operations subsequent to the extrusion operation.

Additional objects and advantages of my invention should be apparent to those skilled in the art from the following description when considered with the accompanying drawing illustrating a top plan view of the tile measuring machine with the guide members leading the tile into the measuring area and the moving belt carrying the tile passing therethrough.

Referring more particularly to the drawing in which is shown an illustrative embodiment of the present invention, a moving belt 11 carries the tile 12 from the extruding and cutting operations to the measuring apparatus 13. As the tile 12 on the belt 11 approach the measuring apparatus, the tile moves between guide members 14 and 15 which properly orient the tile for the measuring operation. Guide member 14 is a stationary angle iron bolted to the frame of the machine and extends parallel to the moving belt 11. Guide rollers 16 extend through openings 17 in the vertical flange 18 of the angle iron, said guide rollers mounted on spindles 19 extending upwardly from the horizontal flange 21 of the angle iron.

The guide member 15 is a movable angle iron mounted for movement relative to a stationary angle iron 22 which is bolted to the machine frame by bolts 23. The vertical flange 24 of the angle iron 22 contains openings 25 therethrough for the passage of bolts 26 which are secured to the vertical flange 27 of the movable guide 15. Sleeves 28 are mounted on the vertical flange 24 to aid in guiding the bolts 26, movement of the bolts being limited by nuts 29 on the ends of the bolts. The bolt 26 nearest the measuring apparatus 13 is longer than the other bolt and is surrounded by a compression spring 31 between the vertical flanges 24 and 27 of the angle irons 22 and 15, respectively. The spring 31 constantly urges the end of the guide member 15 towards the movable belt 11.

Rollers 32 mounted on spindles 33 extending upwardly from the horizontal flange 34 of the movable guide 15 extend through the vertical flange 27 and engage the tile 12 and keep the tile straight and properly aligned as it enters the measuring apparatus. The measuring apparatus 13 includes supporting platforms 35 and 36 mounted on the frame of the machine. The platform 35 is mounted by means of bolts 37 while the platform 36 has elongated slots 38 and fastening means 39 passing through the slots to adjustably mount the platform 36 relative to the moving belt 11.

The platform 35 carries guide rollers 41 which are aligned with the rollers 16 on the stationary guide member 14. The last roller on the platform is the anvil wheel 41ª the purpose of which will be apparent later. Also mounted on the platform are the tile markers 42 which include the coils 43, 44, 45 and the marker arms 46, 47, 48. Each marker arm extends from its actuating coil over the moving belt and tile and terminates in a downwardly extending marker 49. A flexible spring 50 for each marker arm is secured at one end to the platform 35 and engages its respective marker arm to retract the arm immediately after actuation of its associated coil. In this embodiment, the three marks are to be located in a vertical line as viewed in the drawing so the arm 46 extends over the belt farther than arm 47 and has an angularly arranged arm section 51. In a like manner, arm 48 extends farther over the belt than arm 46 and has the angularly arranged portion 52. The angular arm portions allow the marks to be in a straight line.

A support arm 53 is secured to the platform 35 and extends upward from the platform and over the moving belt 11. This arm carries an adjustably mounted bifurcated element 54 having arms 55 and 56. Extending between these arms is a shaft 57 rotatably supporting a timer wheel 58. The timer wheel is so located as to contact the upper surface of the moving tile 12, the motion of the tile causing the wheel 58 to rotate. On the side of the wheel 58 facing platform 35 is located an annular ring 59 of copper or other highly electrical conductive material. A contact brush 61 is supoprted by the arm 55 and has a sliding contact with the annular copper contact 59. On the opposite face of the wheel 58 are a pair of diametrically opposed laterally projecting contact points 62.

The opposite arm 56 supports a breaker switch 63 which is momentarily contacted by one of the points 62 during each 180° revolution of the timer wheel 58. Both the breaker switch 63 and the contact brush are electrically insulated from the arms 55 and 56. The annular copper contact 59 has electrical communication with both of the contact points 62.

The platform 36 supports two spring-biased arms 64 and 68 having guide rollers. The arm 64 is pivoted as at 65 and supports a guide roller 66; a spring 67 biasing the 64 outwardly over the moving belt 11. This arm, being adjacent to the movable guide bar 15, also tends to urge the moving tile 12 against the guide rollers 41 on the platform 35 for proper orientation in the machine. The sizing bar 68 is also pivoted as at 69 and supports a spindle wheel 70 opposite the anvil wheel 41ᵃ on the platform 35. The sizing bar is also spring-biased over the belt 11 by a spring 71.

The breaker switch 63 is connected to the sizing bar 68 by a line 72 connected to a screw or other pole 73, the sizing bar being insulated from the platform 36. Rigidly attached to the pivot 69 for the sizing bar 68 is an indicator arm 74 having a pointer 75. A graduated scale 76 is formed on the platform 36 so that the pointer 75 will visually indicate the size of the tile being measured. A switch box 77 is mounted on the platform 36 immediately in back of the sizing bar 68. Three switch contacts 78, 79, 80 are spring-biased to project from the switch box by compression springs 81. Each switch communicates with one of the contacts 82, 83, 84 on the back of the switch box.

The sizing bar 68 has an electrically conductive strip of metal 85 on the side of the bar facing the switch contacts, the bar adapted to pivot and contact with switch contact 78, the switch contacts 78 and 79, or the switch contacts 78, 79 and 80. The swich contacts move into the switch box against the action of the springs when forced to do so by the sizing bar 68. The contact 82 on the switch box 77 communicates with the switch contact 78 and is connected by the line 86 to the coil 43. In a like manner, contact 83 communicates with switch contact 79 and with coil 44 through the line 87, and contact 84 communicates with switch contact 80 and with coil 45 through the line 88.

A main switch box 89 is mounted on the platform 36 or other suitable location and contains an on-off switch 91. The lines 92, 93 coming into the box communicate with a suitable D.C. or A.C. power source. A line 94 leads from the box 89 to the contact brush 61 and lines 95, 96, 97 extend from the box to the coils 43, 44, 45, respectively.

When the machine is in operation, the tiles 12 are moving on the belt 11 from the extruder or other source toward the measuring apparatus 13. The tiles move between the guide members 14, 15, the movable guide 15 with the guide rollers 32 urging each tile against the rollers 16 on the stationary guide 14. The guide roller 66 on the spring-biased arm 64 also tends to urge the tiles against the rollers 41 on the platform 35. The tiles pass under the timer wheel 58 causing the wheel to rotate. The switch 91 being in its on position feeds current through line 94, contact brush 61 and the annular ring 59 to the contact points 62. As each points 62 contacts the breaker switch 63, during rotation of the wheel 58, current is momentarily fed to the spring-biased sizing bar 68. As the tiles 12 continue under the timer wheels, the tile moves with one edge contacting the anvil wheel 41ᵃ. The opposite edge of the tile contacts and forces the spindle wheel 70 away from the moving belt 11 against the force of the spring. As the wheel 70 moves, the sizing bar 68 pivots around the pivot point at 69 and contacts the switch contacts 78, 79 and 80, depending on the size of the tile. At the same time, the pointer 75 visually indicates the size of each tile to the machine operator by its position on the scale 76.

If the tile is the proper size, the sizing bar engages switch contact 78; if the tile is slightly oversize, switch contacts 78 and 79; and if the tile is even larger, switch contacts 78, 79 and 80. The current is passed from the sizing bar through the switch contacts 78, 79, 80 to their appropriate coils 43, 44, 45. Energization of any of the coils will move its marker arm and marker downward to engage the tile and leave an indicator dot or mark. Since the current is only momentarily fed to the sizing bar 68 due to the breaker switch 63 and the contact points 62, the coil or coils are momentarily energized leaving only a slight mark or dot on each tile. When the current supply is broken, the flexible springs 50 retract the arm or arms actuated. Thus, if the tile coming from the measuring apparatus 13 has no marks, it is undersize. If the tile has one dot, it is of proper size; two dots, slightly oversize; and three dots, substantially oversize. The tiles can then be easily sorted according to size, undersize tiles rejected and oversized tiles trimmed down. A second and similar measuring machine may follow this apparatus 13 to measure the other dimension of each tile.

While the invention has been shown and described as being advantageously applicable to measuring tile, it is not my desire or intent to unnecessarily limit the scope of the utility of the inventive features by virtue of this illustrative embodiment.

Having disclosed the invention, I claim:

1. A measuring device comprising a belt carrying the articles to be measured, a pair of guide members, and a measuring station subsequent to said guide members and through which said belt passes, said measuring station comprising guide wheels mounted on one side of said belt, a sizing bar pivotally mounted intermediate its ends on the other side of said belt opposite said guide wheels, a spindle wheel mounted adjacent one end of said sizing bar, said sizing bar being spring-biased toward said belt so that the spindle wheel is contacted by said articles, a plurality of switches mounted so that said sizing bar will contact one or more of the switches when it is urged away from the belt by contact with said articles, a plurality of marker arms on the side of the belt opposite said switches, each marker arm terminating in a marker extending over the articles, a coil for each marker arm connected to one of said switches, an arm extending across said belt, a bifurcated member on said arm, a timer wheel supported by said bifurcated member, contact points on said timer wheel, and a breaker switch electrically connected to said sizing bar and adapted to be contacted by said contact points as said timer wheel is turned by movement of said articles on the belt.

2. A measuring device as set forth in claim 1, in which the timer wheel has an annular copper contact on one side of said wheel and connected to said contact points, a contact brush slidably engaging said annular contact, and a source of power having one line connected to said contact brush and the other line connected to said coils so that when one of the contact points engages said breaker switch, a circuit through the contact brush, annular copper contact, contact point, breaker switch, sizing bar, switches and coils will be energized to momentarily depress at least one of said markers to mark the article passing therebelow.

3. A measuring device comprising a moving belt carrying articles to be measured, spaced guide members one being fixed and the other movable for orienting the articles on the moving belt for the measuring operation, and a measuring station comprising rollers on and projecting inwardly from said fixed guide member at one side of the station guiding articles passing therethrough, a sizing bar pivotally mounted intermediate its ends on the opposite side of the station, a roller mounted adjacent one end of said bar, resilient means connected to said bar to pivot the bar and urge said last mentioned roller against the articles to be measured, a plurality of switches adapted to be actuated by said sizing bar depending on the size of the articles being measured, a plurality of markers extending over the articles with each marker actuated by one of the switches to indicate the size of the articles on said articles, and a timer wheel actuated by said moving articles to momentarily complete a circuit to actuate said markers.

4. A measuring device as set forth in claim 3, in which a pointer is attached to said sizing bar at the end opposite to said roller, and an indicating scale cooperating with said pointer to visibly show the size of each article being measured.

5. A measuring device as set forth in claim 3, in which said timing wheel includes at least one contact point on said wheel, a breaker switch actuated by said contact point and connected to said sizing bar, an annular electrically conductive contact connected to said contact point, a brush slidably engaging said annular contact, and a source of power connected to said brush and to said markers.

6. A measuring device as set forth in claim 5, in which a solenoid coil actuates each of said markers to depress the marker to contact the article being measured.

References Cited in the file of this patent
UNITED STATES PATENTS

| | | |
|---|---|---|
| 1,011,123 | Degelow | Dec. 5, 1911 |
| 1,066,239 | Achert | July 1, 1913 |
| 1,281,740 | Yingling | Oct. 15, 1918 |
| 1,629,776 | Cutler | May 24, 1927 |
| 2,528,106 | Albrecht | Oct. 31, 1950 |
| 3,001,787 | Socke | Sept. 26, 1961 |